(12) United States Patent
Schnuckle et al.

(10) Patent No.: US 7,159,994 B2
(45) Date of Patent: Jan. 9, 2007

(54) SYSTEM AND METHOD FOR GENERATING A FLICKERING FLAME EFFECT

(75) Inventors: Gary Schnuckle, Altadena, CA (US); Holger Irmler, Studio City, CA (US); Alfredo Ayala, West Covina, CA (US); Jamie Robertson, Wayland, MA (US); Bryan S. Tye, Canyon Country, CA (US)

(73) Assignee: Disney Enterprises, Inc., Burbank, CA (US)

( * ) Notice: Subject to any disclaimer, the term of this patent is extended or adjusted under 35 U.S.C. 154(b) by 163 days.

(21) Appl. No.: 10/915,794

(22) Filed: Aug. 10, 2004

(65) Prior Publication Data

US 2006/0034079 A1 Feb. 16, 2006

(51) Int. Cl.
*F21S 13/10* (2006.01)
(52) U.S. Cl. .................. 362/161; 362/565; 362/559; 362/555
(58) Field of Classification Search ................ 362/555, 362/563, 565–569, 392, 393, 810, 284; 40/428; 385/901
See application file for complete search history.

(56) References Cited

U.S. PATENT DOCUMENTS

| | | |
|---|---|---|
| 2,435,811 A | 2/1948 | Waters |
| 2,976,450 A | 3/1961 | Benoleil et al. |
| 3,233,093 A | 2/1966 | Gerlat |
| 3,384,774 A | 5/1968 | English |
| 3,514,660 A | 5/1970 | Kopelman |
| 3,639,749 A | 2/1972 | Beckman |
| 3,681,588 A | 8/1972 | Lee |
| 4,328,534 A | 5/1982 | Abe |
| 4,551,794 A | 11/1985 | Sandell |
| 4,617,614 A | 10/1986 | Lederer |
| 4,777,571 A | 10/1988 | Morgan |
| 4,866,580 A | 9/1989 | Blackerby |
| 4,965,707 A | 10/1990 | Butterfield |
| 5,097,180 A | 3/1992 | Ignon et al. |
| 5,381,325 A | 1/1995 | Messana |
| 6,302,555 B1 | 10/2001 | Bristow |
| 6,312,137 B1 | 11/2001 | Hsieh |
| 6,454,425 B1 | 9/2002 | Lin |
| 6,461,011 B1 | 10/2002 | Harrison |
| D486,924 S | 2/2004 | Skradski et al. |
| 6,688,752 B1 | 2/2004 | Moore |
| 6,712,493 B1 | 3/2004 | Tell et al. |
| 7,083,315 B1 * | 8/2006 | Hansler et al. ............. 362/559 |
| 2002/0080601 A1 | 6/2002 | Meltzer |
| 2003/0041491 A1 | 3/2003 | Mix |
| 2003/0053305 A1 | 3/2003 | Lin |
| 2004/0165374 A1 | 8/2004 | Robinson |
| 2005/0097792 A1 * | 5/2005 | Naden ..................... 40/428 |

FOREIGN PATENT DOCUMENTS

JP 06052709 2/1994

\* cited by examiner

*Primary Examiner*—Sandra O'Shea
*Assistant Examiner*—Anabel Ton
(74) *Attorney, Agent, or Firm*—Greenberg Traurig, LLP; Louis J. Bovasso, Esq.; Stuart T. Langley, Esq.

(57) ABSTRACT

A system for creating a flickering effect comprises a light communicating cable, at least one light receiving cable secured on a rotatable mount rotatable about a horizontal axis, a light diffuser element in communication with the at least one light receiving cable and a rod connected to the diffuser element for causing rotary motion of the light diffuser surface about the horizontal axis.

50 Claims, 7 Drawing Sheets

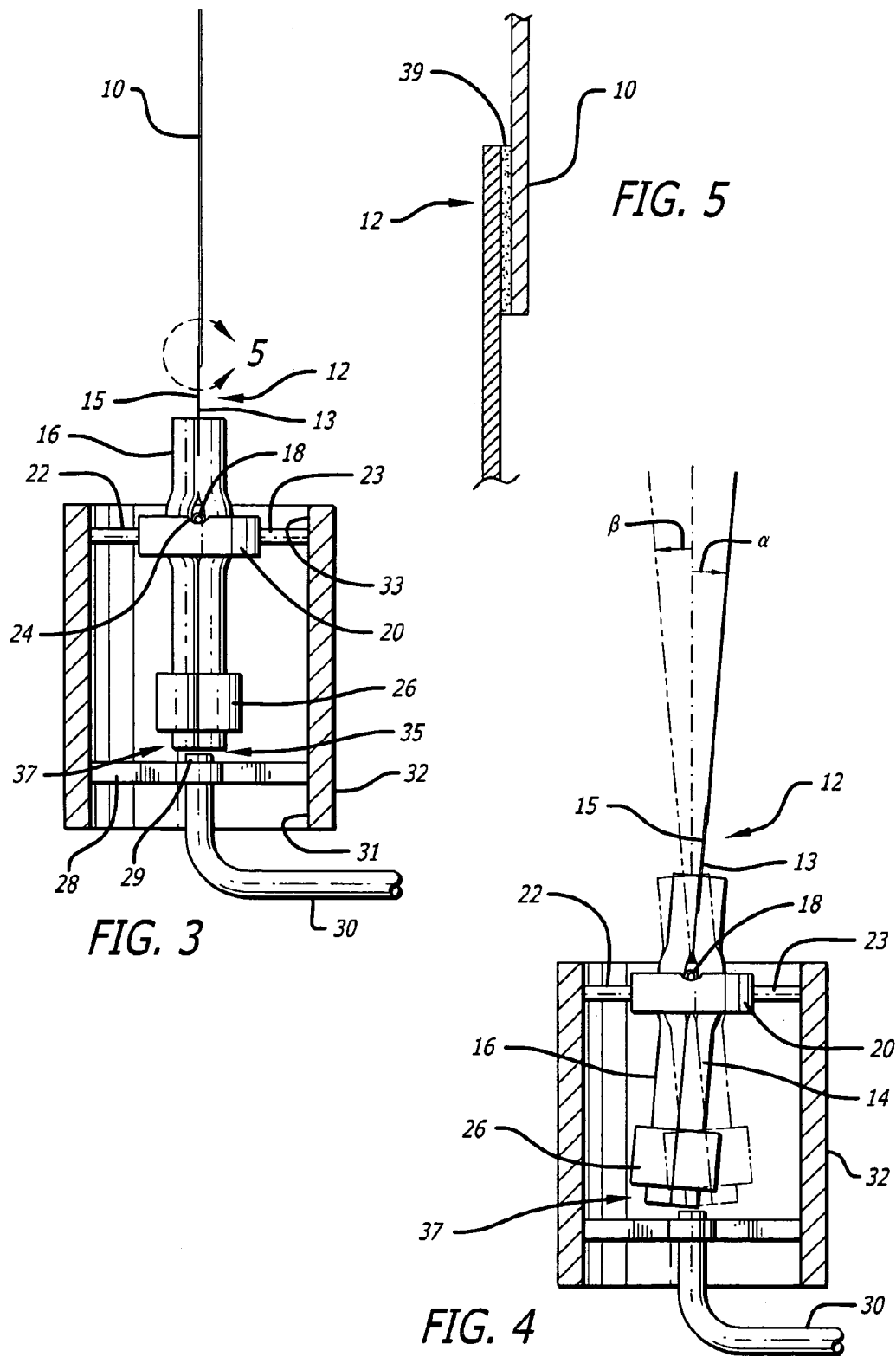

SYSTEM AND METHOD FOR GENERATING A FLICKERING FLAME EFFECT

BACKGROUND

The present disclosure relates generally to the creation of artificial light effects for entertainment and novelty applications.

DESCRIPTION OF THE BACKGROUND ART

The generation of a flickering flame effect is important in entertainment applications, since it provides a mechanism for simulating the flicker of a candle without actually using a candle. This is important since it provides numerous safety benefits as well as an ability to keep the artificial flame "burning" in the presence of significant air pressure variations.

One type of device that generates an artificial flame is commonly known as a "wiggle wire ball." Specifically, this device is a relatively large ball that has a flat filament, wherein the current in the filament takes a random path which alters from time to time, thereby simulating a flickering flame effect.

Another such device includes a series of orange and white LEDs that are cast in resin having a flame shaped surface. A current supplied to the LED's in a particular sequence gives rise to a flickering flame effect.

Yet another device is commonly referred to as a "silk flame." The silk flame includes a piece of silk that is blown upwards by a fan, causing it to undulate. A light projected on the silk piece is reflected off of the silk while it is moving, thereby creating a flickering flame effect. Another device for generating an artificial flickering flame effect is a lamp having a flicker circuit, wherein the flicker circuit is used to modulate the glowing light source within the bulb, thereby giving an appearance of a candle burning inside a lantern or a sconce.

Another flickering flame device is a light bulb inside a flame shaped plastic object, which has wires incorporated into it. The wires interact with electromagnets causing the flame shaped object to tilt from side to side under control of an electronic circuit.

SUMMARY

The foregoing devices are either bulky, unsafe or do not provide a realistic flickering flame effect. Thus, the system discussed below includes an apparatus and a method for synthesizing an artificial flame that provides a realistic flickering flame effect that is safe and easy to manufacture.

One aspect of the system disclosed herein provides an artificial flickering effect that simulates the flickering of a candle flame. In this aspect, the apparatus comprises: (i) at least one light communicating channel, (ii) a flame shaped surface in communication with a first end of the at least one light communicating channel, (iii) a mount for rotatably securing the at least one channel, (iv) a fiber optic cable spaced from the at least one channel for delivering the light signal to a second end of the at least one channel, wherein the rotation of the at least one channel about at least one axis of the mount creates an artificial flickering flame on the flame shaped surface. Additionally, the at least one channel may be designed to rotate about the orthogonal axes of the mount. The apparatus may further comprise a thin rod in communication with the flame shaped surface, wherein the rod is sensitive to air pressure variations, thereby causing the flame shaped surface to rotate about the orthogonal axes of the mount.

In another aspect of the system, a method for generating diffused light comprises: (i) receiving a light signal at a first end of an at least one fiber optic channel, wherein the at least one channel is rotatably secured on a mount and wherein the at least one fiber optic channel rotates about at least one axis of the mount, (ii) delivering the light signal to a diffuser surface which is in communication with a second end of the at least one channel, wherein the rotation of the at least one fiber optic channel about an least one axis of the mount creates diffused light about the diffuser surface. Additionally, the method may further include the steps of rotatably securing the ring to a cylindrical enclosure surrounding the ring and providing a light signal from a light source, wherein the light source is a light-emitting diode (LED).

BRIEF DESCRIPTION OF THE DRAWINGS

FIG. 3 is a view taken along line 3—3 of FIG. 2;

FIG. 4 is a view similar to the FIG. 3 illustrating the displacement of the flame shaped surface and associated components of the device of FIG. 2 during a flicker event;

FIG. 5 is a cross sectional view of the device of FIG. 3 taken along line 5 of FIG. 3;

DESCRIPTION OF THE EMBODIMENTS

Although specific embodiments of the present disclosure will now be described with reference to the drawings, it should be understood that such embodiments are by the way of example only and merely illustrative of but a small number of the many possible specific embodiments which can represent applications of the principles of the present disclosure. Various changes and modifications obvious to one skilled in the art to which the present disclosure pertains are deemed to be within the spirit, scope and contemplation of the present disclosure as further defined in the appended claims.

Figure 1:
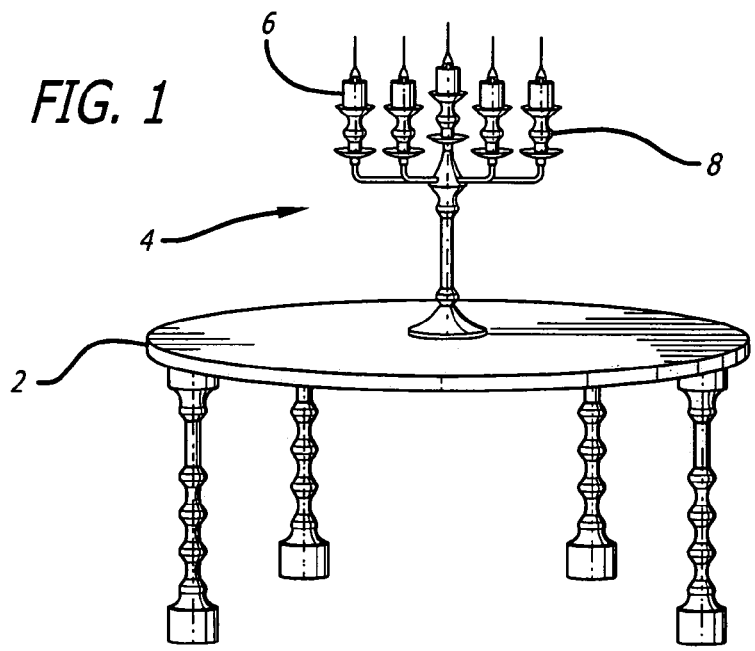
FIG. 1 is a perspective view of a candelabrum holding several artificial flame devices according to an embodiment of the disclosure, appearing as candles.

FIG. 1 is an exemplary depiction of a candelabrum 4 holding several artificial flickering flame devices 6 mounted on a table 2. The devices 6 are shown as candle shaped and are positioned on individual supports 8 of the candelabrum 4. Of course, the devices 6 may be other shapes, and need not resemble cylindrical candles per se, but could be any whimsical or geometric shape, just as candles can be found in myriad shapes, such as cartoon figures, pyramids, motor vehicle shapes, flowers, sculptures etc. Furthermore, the candelabra and table 2 are not necessary and any suitable support may be used. An artificial flame device 6 may also be fully or partially enclosed within a surrounding structure, such as in a globe or other container.

Figure 2:
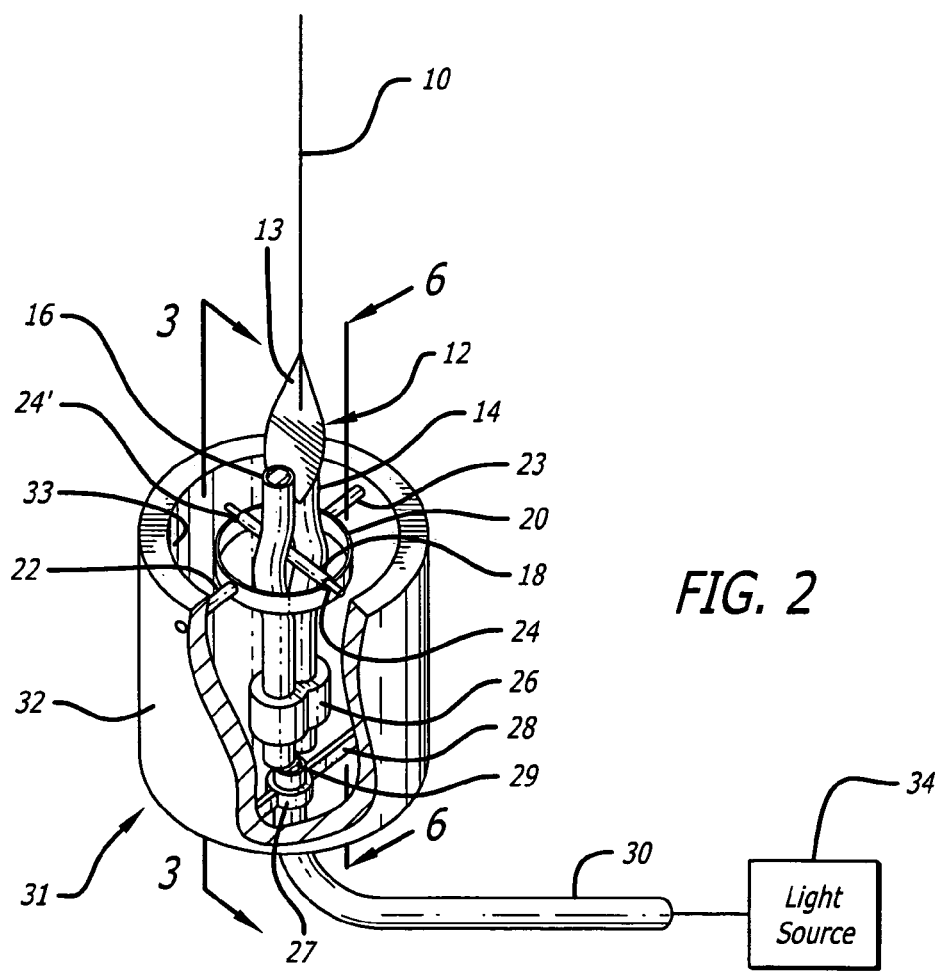
FIG. 2 is a cut away perspective view of one of the artificial flame devices of FIG. 1.

FIG. 2 is a view of one of the artificial flicker flame device 6 of FIG. 1. In this embodiment, the artificial flickering flame effect is created through air-pressure variations applied to the reflecting surfaces 13, 15 (see also FIG. 3) of element 12, which may be somewhat flame shaped, FIG. 2, and/or to the stem 10 attached to element 12 and extending generally upwardly therefrom. In other words, air moving against the components, such as airflow created by a fan, causes the components to move on a gimbal mechanism, as described below.

The device in FIG. 2 may comprises a generally cylindrical housing 32 open at both ends 31, 33, respectively (see also FIG. 3). A light conduit 30, such as a fiber optic cable, FIG. 2, is positioned near a light source 34, and is held in position in open end 31 by a support frame 28. Support frame 28 includes a central hub 27, through which conduit 30 extends, and at least two outwardly oppositely extending arms 28 fixed to hub 27 and the inner wall of housing 32.

A gimbal mechanism is mounted in the open end 33 of housing 32 having a ring-shaped member 20. Ring-shaped member 20 is supported within housing 32 by a pair of pins 22, 23, respectively, each pin 22, 23 being fixedly secured to the outer periphery of member 20 and rotatably secured to the inner wall of housing 32. The pins 22 and 23 thus permit the member 20 of the gimbal mechanism to rotate about the longitudinal axes of the pins 22 and 23.

The member 20 includes a pair of spaced grooves 24 and 24' on its upper surface. A rod 18 is disposed in the grooves 24, 24' and acts as a support for mutually communicating cables that are designed to carry a light signal, such as optical cables 14 and 16. The cables 14, 16 rotate about at least one axis (viz., the longitudinal horizontal axis passing along the length of the rod 18, as seen in dotted lines in FIG. 4).

The cables 14 and 16 (FIG. 2) may be coupled together by a connector 26 through which they extend (see also FIG. 2). Positioned in between the two cables 14 and 16 is a teardrop shaped element 12, simulating a flame. Element 12 may be made of plastic, rubber, or any other composite material, either substantially transparent or opaque material, and may be appropriately colored to heighten the perception of a flickering flame effect. Additionally, a substantially long thin wire or stem 10 may be attached by any suitable means to the flame shaped element 12 to create a wispy smoke effect.

As seen in FIG. 3, a gap 35 separates the light carrying cable 30 from the light carrying cables (14, 16), the flame shaped element 12, the member 20 and pins 22, 23.

The rotation of the gimbal mechanism 20, 22, 23 and the mutually connected light carrying cables (14, 16), along with the flame shaped element 12 and member 20 about rod 18, causes the lower end of the mutually connected cables (14, 16) to be displaced from their stationary position of FIG. 3 to the positions illustrated in the dotted lines in FIG. 4.

FIG. 5 illustrates how element 12 is bonded to the stem 10 which is in the form of a thin rod, by any suitable adhesive 39.

Figure 6:
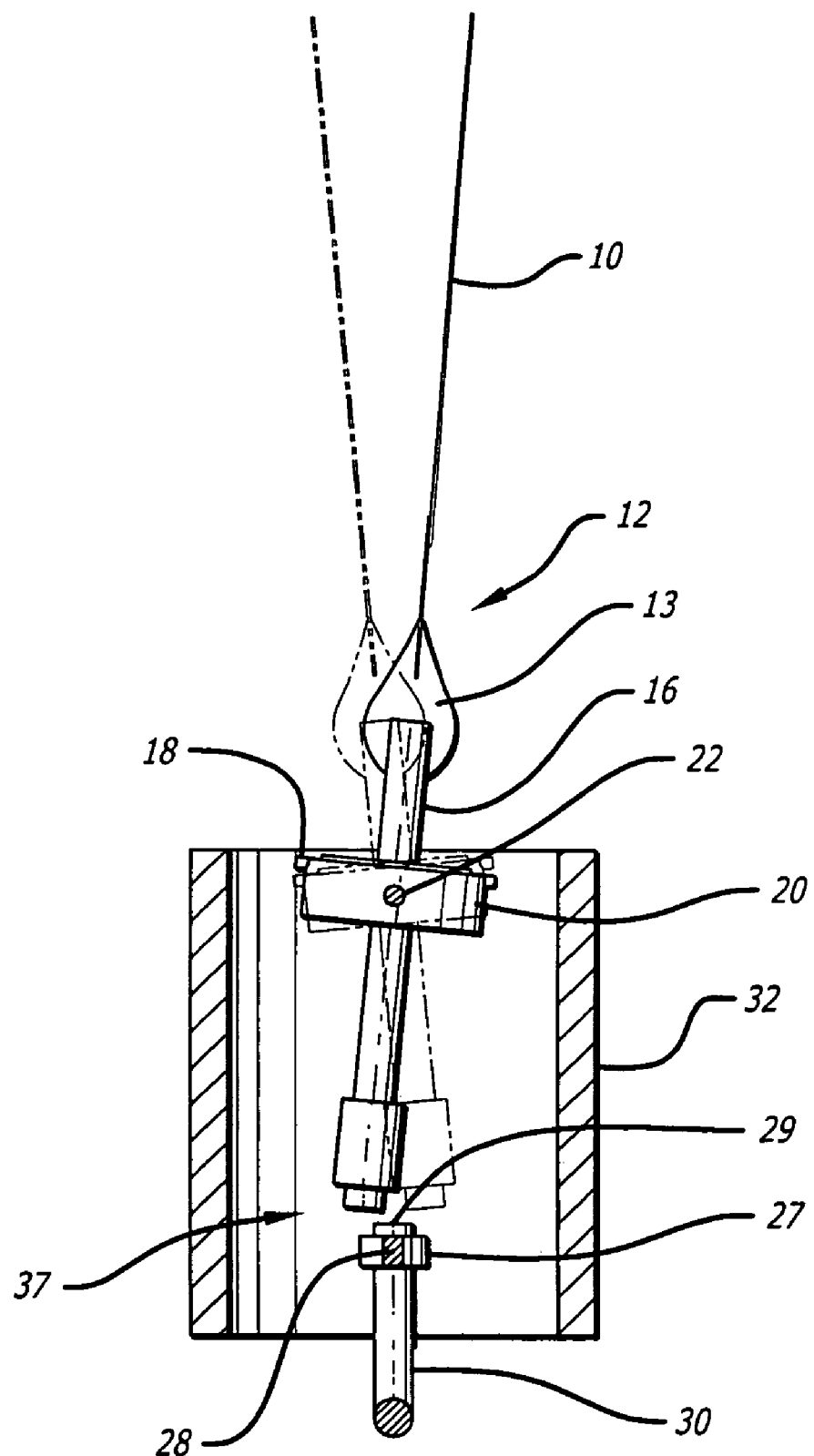
FIG. 6 is a view taken along line 6—6 of FIG. 2.

FIG. 6 illustrates the rotation of the structure comprising the gimbal mechanism (20, 22, 23), and the mutually connected light carrying cables (14, 16), and the flame shaped element 12 about an horizontal axis passing through pins 22 and 23. This causes the lower end 37 of the connected cables (14, 16) to be displaced from the stationary position of FIG. 3. As heretofore mentioned, the same effect occurs along the axis of rod 18 as discussed with respect to FIG. 4.

Thus, in summary, there are at least two degrees of rotation in the artificial candle (viz., rotation of the flame shaped element 12 about rod 18, and rotation of the flame shaped element 12 about the pins 22, 23).

The operation of the artificial candle 6 for creating a flicker flame effect is described as follows. A light signal, generated by a light source 30, propagates through the optical cable 30, and is emitted at one end 29 of the cable 30 into the air gap 35, which may be about 80 thousandths of an inch wide. In a stationary condition (i.e., when there is substantially no displacement of the thin rod 10), the light arriving from cable 30 is delivered to at least one of the two mutually connected cables (14, 16). The light carried by at least one of the two cables (14, 16) is then delivered to at least one face 13 or 15 of the flame shaped element 12 presenting the perception of a flame. In the condition where air-pressure variations induce motion of the structure comprising (i) the gimbal mechanism (20, 22, 23), (ii) the mutually connected light carrying cables (14, 16), and (iii) the flame shaped element 12, movement of the lower end 37 of the cables (14, 16) away from the stationary state will cause light to reflect or diffuse, completely or partially, on at least one of the faces of the flame shaped surface, thereby creating an artificial flickering flame effect.

Specifically, FIG. 3 shows a stationary state situation where light arriving via the optical cable 30 is delivered to both of the mutually connected cables (14, 16) via the gap 35. Subsequently, the light signal propagates through both of the mutually connected cables (14, 16) towards the flame shaped element 12 to be reflected or diffused about both faces 13 and of element 15, thereby giving the appearance of a flame.

As shown in FIG. 4, when there is a substantial rotational movement by an angle α about rod 18 (i.e., the angle between the vertical and thin stem 10) 18, of the structure comprising: (i) the gimbal mechanism (20, 22, 23), (ii) the mutually connected light carrying cables (14, 16), and (iii) the flame shaped element 12, the lower portion of the mutually connected cables is displaced from its stationary position (FIG. 3) in a manner that light from the cable 30 is reflected off face 13 of the flame shaped element 12. In the case where the rotational angle α is large, the light is attenuated significantly (as it does not propagate through cable 14) and hence there is a lower reflection off of face 13.

Figure 7:
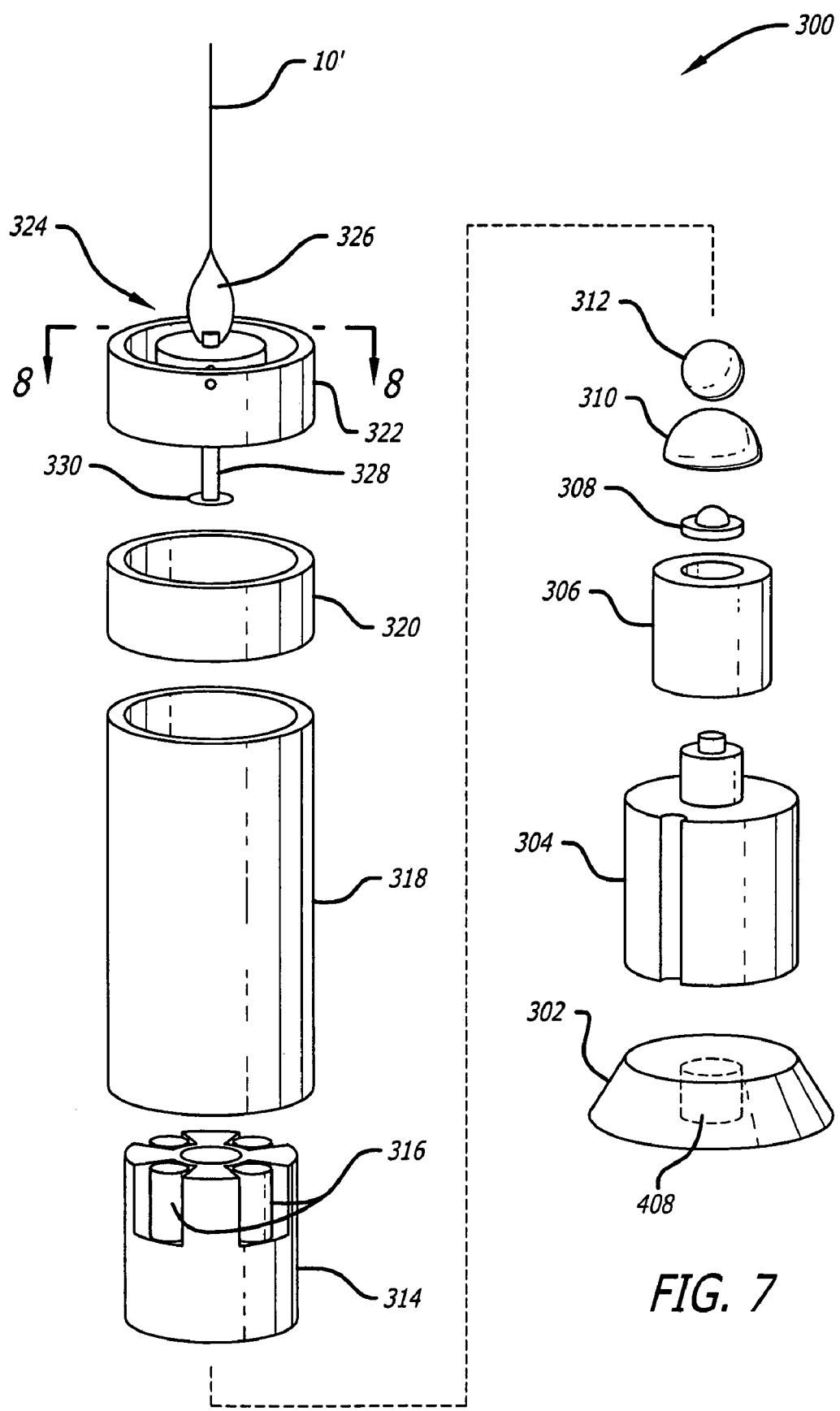
FIG. 7 is an exploded view of an artificial flame candle according to another embodiment of the disclosure.

In another exemplary embodiment, an artificial candle 300, as shown in FIG. 7, includes a control board 302 having suitable electronics (e.g., current pulsing circuits, memory module, micro-controller, portable power source, power converter, etc.), represented by microcontroller 408, a solid state device (e.g., an LED) 308 positioned on a mount 306, and a heat sink 304 for efficient extraction of heat from the LED 308. At least one lens system (shown herein as two separate lenses, such as condenser lens 310 and ball lens 312 in one exemplary aspect) is positioned on the mount 306 to allow optimal focusing of the LED light output. Electromagnets 316 may be positioned on a base 314 for generating an electromagnetic field. A tube 318, which may be of a composite material of nylon and aluminum, provides a guiding means for the light arriving from the LED system. In one aspect, the combination of the control board 302, the heat sink 304, the solid state device 308 (including mount 306 and lenses 310, 312), and the electromagnets 316 may be housed inside the tube 318.

Figure 8:
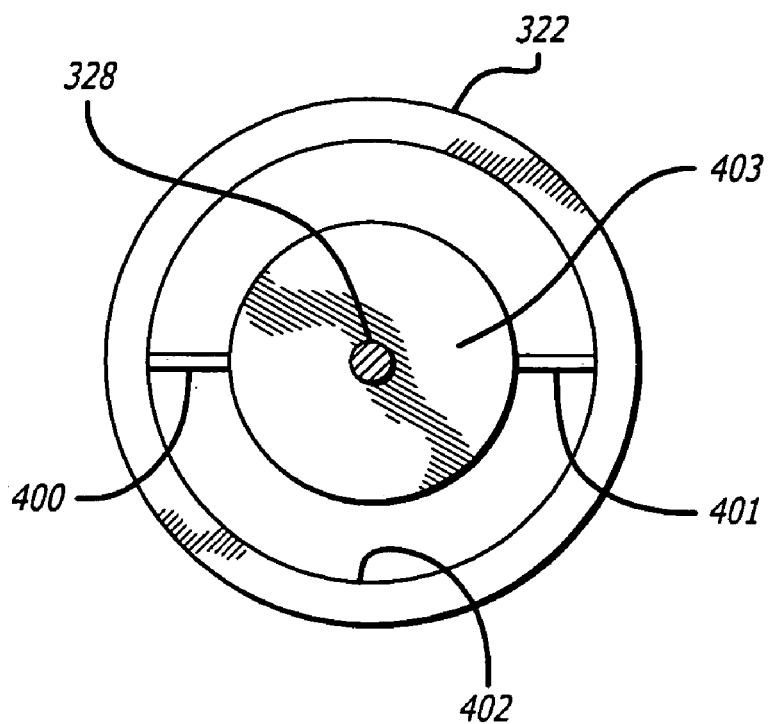
FIG. 8 is a view taken along lines 8—8 of FIG. 7.

A gimbal structure 324, having a cylindrical housing 322, may be in contact with a spacer 320 for substantially separating the gimbal structure 324 from the tube 318, in order to allow optimal projection of the light output from the LED system onto the flame shaped element 326 (similar to element 13 of FIG. 1). A rod 328 which may be solid or hollow, with a base 330, is in communication with the flame shaped element 326 and allows light to be conducted or delivered onto the reflecting surfaces of element 326. It is to be understood that housing 322 has a pair or outwardly extending pins 400, 401 (see FIG. 8) rotatably secured to both the inner wall 402 of cylindrical housing 322 and inner cylindrical member 403 having rod 328 extending therethrough and reciprocal therein. Thus, rod 328, and element 326, move about the elongated axes of pins 400, 401 and up and down within member 403.

A thin member 10, FIG. 7, similar to member 10 of FIG. 1, may be fixed to element 326 extending upwardly therefrom.

The operation of the artificial flame candle 300 is as follows. The desired movement pattern of the flame shaped surface 326 may be encoded and stored in the memory module 408 of the control board 302 in the form of digital data or control signals. The control board 302 may include a micro-controller (not shown), which excites the electromagnets 316 based on the encoded digital data arriving from the memory module 408 on the control board 302. Specifically, the electromagnets 316 are arranged on the base 314 and are excited by the signal from the control board 302 to create a field with a certain polarity around the electromagnets 316. In one aspect, the digital data may be programmed from an external computer (not shown). Furthermore, the control board 302 may be either battery operated (e.g., with a 5V battery) or it could be energized through an AC power supply.

The magnetic base 330 will either move away or towards the electromagnets 316 depending on whether the electromagnetic field is of the same polarity as the base 330 or not. The movement of the magnetic base 330 towards or away from the electromagnets 316 will induce a rotational motion of the gimbal structure 324 about the horizontal (or vertical) plane. Due to this rotational motion of the gimbal structure 324, light arriving from the LED 308 will be reflected, completely or partially, off at least one of the faces of the flame shaped surface 326, thereby creating an artificial flicker flame effect.

Figure 9:
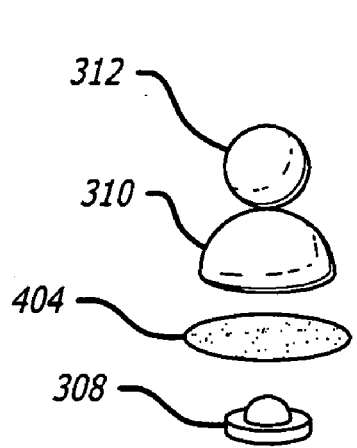
FIGS. 9 and 10 are exploded views of a portion of the candle of FIG. 7 showing two modifications thereof.
Figure 10:
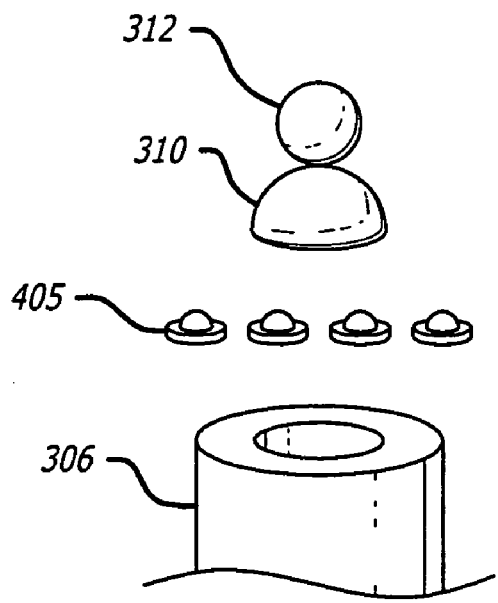

In another embodiment, a dichroic filter 404 (FIG. 9—like numerals referring to like parts of FIG. 7) may be positioned between the LED 308 and the condenser lens 310. The dichroic filter 404 alters the wavelength of the LED light output signal, rendering the light output to be of arbitrary color, thereby allowing the artificial flickering flame to be of any color. Alternatively, as seen in FIG. 10, wherein like numerals refer to like parts of FIGS. 7 and 8, an array 405 of LED's having different operating wavelengths may be housed on the LED mount 306, and electronic switching (not shown) of the array 405 of the LED's may permit arbitrary an color flickering flame effect.

Figure 11:
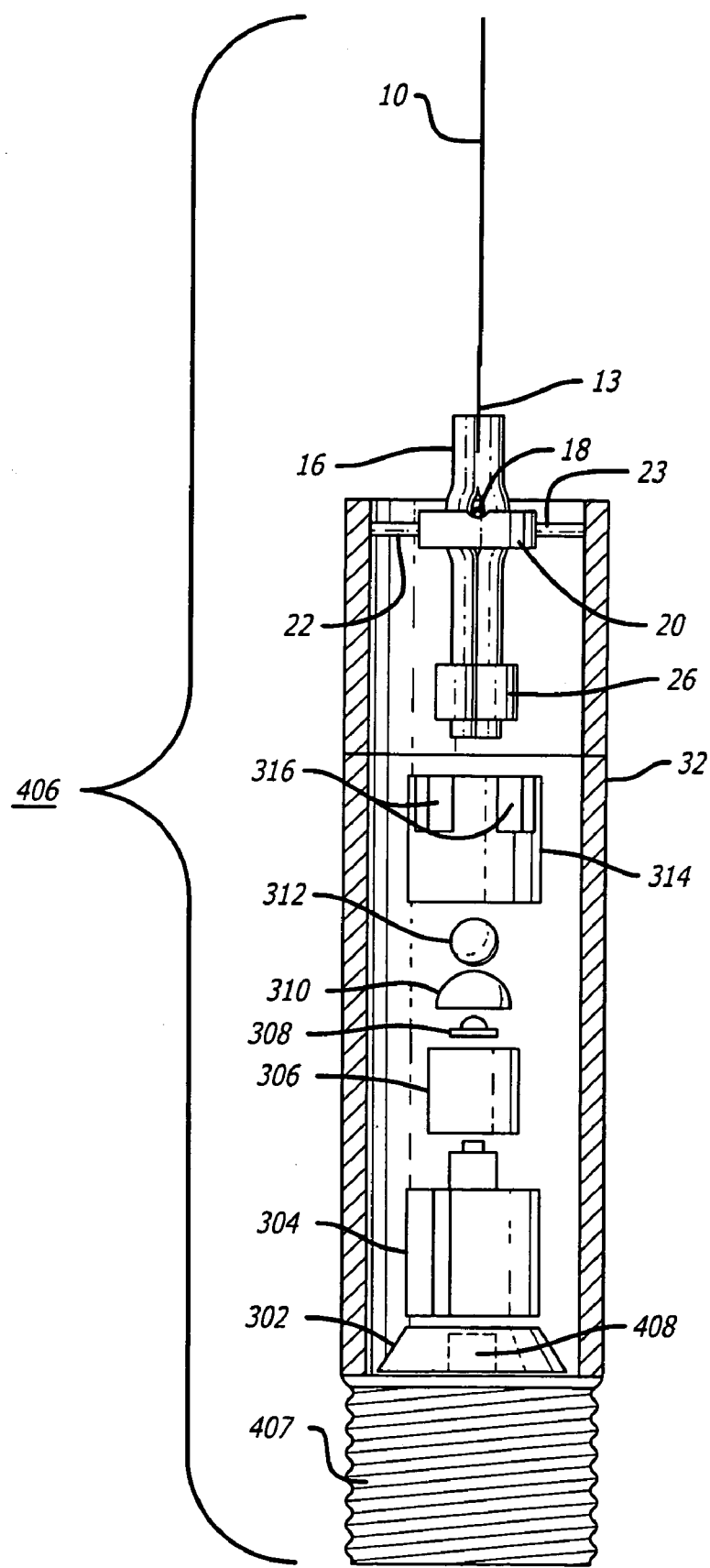
FIG. 11 is an elevational view, partly in section, of another embodiment of the candle of FIG. 7.

It is to be understood that other embodiments may be utilized and structural and functional changes may be made without departing from the respective scope of the disclosure. Possible modifications to the system include, but are not limited to, including the solid-state device 308, the condenser lens 310 and ball-lens 321 of FIG. 7 in the embodiment of FIG. 2. This is shown in the candle 406 of FIG. 11 wherein like numerals refer to like parts of FIGS. 2 and 7. Although particular embodiments have been disclosed, variations thereof may occur to an artisan and the scope of the disclosure should only be limited to the scope of the appended claims. The artificial candle 406 may have the control board 302 within a unitary structure inside of candle 406 or the control board 302 may be external to the artificial candle (not shown). The artificial candle 406 could also have a light bulb screw end 407 to secure the candle 406 to a base (not shown).

Figure 12:
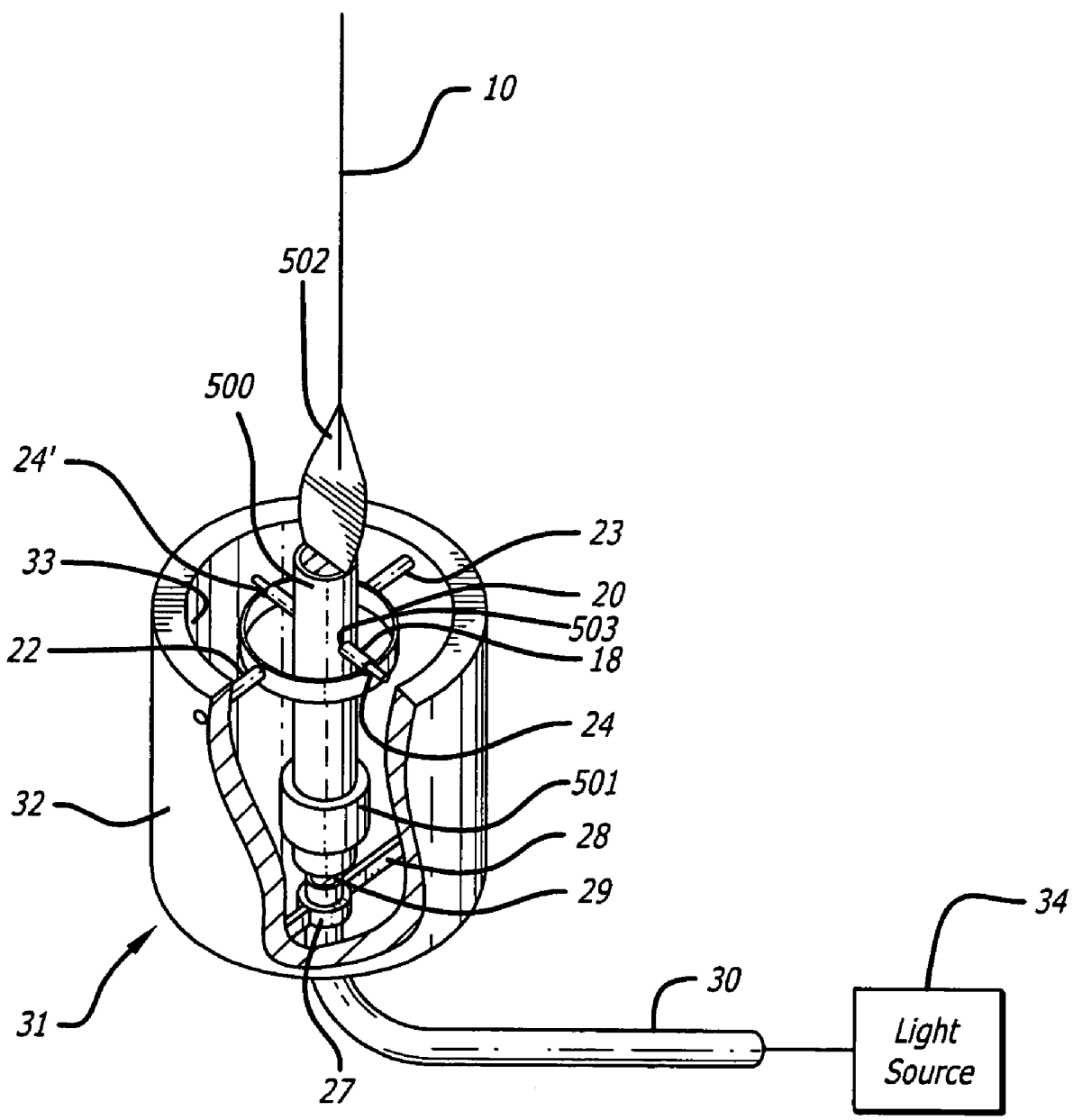
FIG. 12 is a perspective cutaway view of another modification of a flame device in accordance with the invention.

Although the flame device in FIG. 2 shows a pair of cables or light transmitting channels, a single light transmitting channel may be used. Thus, as seen in FIG. 12, wherein like numerals refer to like parts of the embodiment of FIG. 2, a single light transmitting or light carrying channel 500 is shown in place of cables 14, 16. A teardrop shaped element 502, identical to element 12 in FIG. 2, is secured in any suitable manner to the upper end of channel 500. Rod 18 now passes through hole 503 in channel 500. The operation of channel 500 is otherwise identical to the movement of cables 14, 16.

It can be seen that there is disclosed a flame shaped reflector or diffuser integrated with a light pipe (single or multi-channel) which is articulated by a natural and chaotic external or internal force (such as wind, magnetism); above one or more collimated light sources (e.g. fiber optic, LED, incandescent). The reflector or diffuser is balanced with its center of gravity (or movement between the reflector/diffuser and the light source) on a gimbal mechanism allowing movement on a minimum of two axes. The reflector or diffuser moves randomly simulating blowing in the wind.

Although particular embodiments of the disclosure have been discussed, variations thereof may occur to an artisan and the scope of the invention should only be limited by the scope of the appended claims.

What is claimed is:

1. A method for generating diffused light, the method comprising the steps of:
   receiving a light signal at a first end of an at least one light transmitting channel, said channel being a fiber optic cable, the at least one channel being rotatably secured on a mount having two substantially orthogonal axes;
   providing a diffuser surface in communication with a second end of the at least one channel;
   delivering the light signal to said diffuser surface in communication with the second end of the at least one channel; and
   rotating the at least one channel about said axes of the mount, wherein the rotation of the at least one channel about said axes of the mount creates diffused light about the diffuser surface.

2. The method of claim 1 wherein step of providing diffused surface includes the steps of connecting a said surface to said least one channel.

3. The method of claim 1 wherein the step of providing a light source includes the step of providing a light emitting diode (LED).

4. A method for generating diffused light, the method comprising the steps of:
   receiving a light signal at a first end of an at least one light transmitting channel, the at least one channel being rotatably secured on a ring shaped mount;
   providing a diffuser surface in communication with a second end of the at least one channel;
   delivering the light signal to said diffuser surface in communication with the second end of the at least one channel; and
   rotating the at least one channel about said axes of the mount, wherein the rotation of the at least one channel about at least one axis of the mount creates diffused light about the diffuser surface.

5. The method of claim 4 further including the step of rotatably securing the ring shaped mount to a cylindrical enclosure surrounding said ring shaped mount.

6. A method for generating an artificial flickering light effect, the method comprising the steps of:
   delivering a light signal via a fiber optic cable to a first end of an at least one light transmitting channel spaced from said cable, and said at least one channel being rotatably secured on a mount;
   delivering the light signal received by the first end of the at least one channel to a surface in proximity to a second end of the at least one channel;
   wherein the rotation of the at least one channel about at least one axis of the mount creates an artificial flickering light effect on the surface.

7. A method for generating an artificial flickering light effect, the method comprising the steps of:
   delivering a light signal via a fiber optic cable to a first end of an at least one light transmitting channel, and said at least one channel being rotatably secured on a mount having two substantially orthogonal axes and rotatable thereabout;
   providing a diffuser surface in communication with a second end of the at least one channel;
   delivering the light signal received by the first end of said at least one channel to the surface in proximity to a second end of the at least one channel; and
   rotating the at least one channel about said axes of the mount, wherein the rotation of the at least one channel about said axes of the mount creates an artificial flickering light effect on the surface.

8. A method for generating an artificial flickering light effect, the method comprising the steps of:
   delivering a light signal via a fiber optic cable to a first end of an at least one light transmitting channel, and said at least one channel being rotatably secured on a ring shaped mount;
   providing a diffuser surface in communication with a second end of the at least one channel;
   delivering the light signal received by the first end of said at least one channel to the surface in proximity to a second end of the at least one channel;
   rotating the at least one channel about said axes of the mount, wherein the rotation of the at least one channel about at least one axis of the mount creates an artificial flickering light effect on the surface.

9. The method of claim 8 including the step of connecting said surface to the at least one channel.

10. The method of claim 8 wherein the step of providing a light signal includes the steps of providing a light-emitting diode (LED).

11. The method of claim 8 further including the step of rotatably securing the ring shaped mount to a cylindrical enclosure surrounding said mount.

12. The method of claim 8 wherein the step of providing a surface includes the step of providing a flame shaped surface.

13. A system for generating an artificial flickering flame, the system comprising:
    at least one channel for carrying a light signal;
    a flame shaped diffuser surface in proximity to a first end of the at least one channel;
    a mount having at least one axis of rotation rotatably securing the at least one channel thereto, said mount being rotatable about said at least one axis when moved from a stationary position; and
    rotation means for rotating said mount, wherein the rotation of the at least one channel about at least one axis of the mount creates an artificial flickering flame on the diffuser flame shaped surface when said light signal engages said diffuser surface, said system including a fiber optic cable spaced from the at least one channel for delivering the light signal to a second end of the at least one channel.

14. The system of claim 13 further including a light source for providing the light signal.

15. The system of claim 14 wherein the light source is a light-emitting diode (LED).

16. A system for generating an artificial flickering flame, the system comprising:
    at least one channel for carrying a light signal;
    light signal generating means coupled to said channel;
    a flame shaped diffuser surface in proximity to a first end of the at least one channel;
    a mount having two substantially orthogonal axes of rotation and said channel being rotatable thereon; and
    rotating means for rotating said mount about said axes, wherein the rotation of the at least one channel about said axes of the mount creates an artificial flickering flame on the flame shaped diffuser surface when engaged by said light signal.

17. A system for generating an artificial flickering flame, the system comprising:
    at least one channel for carrying a light signal;
    light signal generating means coupled to said channel;
    a flame shaped diffuser surface in proximity to a first end of the at least one channel;
    a ring shaped mount having at least one axis of rotation rotatably securing the at least one channel thereto;
    rotating means for rotating said mount, wherein the rotation of the at least one channel about at least one axis of the mount creates an artificial flickering flame on the flame shaped diffuser surface when engaged by said light signal.

18. A system for generating an artificial flickering flame, the system comprising:
    at least one channel for carrying a light signal;
    light signal generating means coupled to said channel;
    a flame shaped diffuser surface connected to a first end of the at least one channel;
    a mount having at least one axis of rotation rotatably securing the at least one channel thereto;
    rotation means for rotating said mount, wherein the rotation of the at least one channel about at least one axis of the mount creates an artificial flickering flame on the flame shaped diffuser surface when engaged by said light signal.

19. A system for generating an artificial flickering flame, the system comprising:
    at least one channel for carrying a light signal;
    light signal generating means coupled to said channel;
    a flame shaped diffuser surface in proximity to a first end of the at least one channel;
    a ring shaped mount having at least one axis of rotation rotatably securing the at least one channel thereto;
    rotating means for rotating said mount, wherein the rotation of the at least one channel about at least one axis of the mount creates an artificial flickering flame on the flame shaped diffuser surface when engaged by said light signal; and
    a cylindrical enclosure surrounding said ring shaped mount, wherein the ring shaped mount is rotatably secured to the cylindrical enclosure.

20. A system for generating an artificial flickering flame, the system comprising:
- at least one channel for carrying a light signal;
- a flame shaped surface in proximity to a first end of the at least one channel;
- a mount for rotatably securing the at least one channel;
- wherein the rotation of the at least one channel about at least one axis of the mount creates an artificial flickering flame on the flame shaped surface; and
- a thin rod in communication with the flame shaped surface, said rod being sensitive to substantially small air pressure variations thereby causing the flame shaped surface to rotate about at least one horizontal axis.

21. The system of claim 20 wherein the thin rod in communication with the flame shaped surface provides a smoke effect.

22. A system for generating an artificial flickering flame, the system comprising:
- at least one rod for delivering a light signal;
- a flame shaped surface in proximity with a first end of the rod;
- a mount for rotatably securing the rod;
- a light transmitting channel in proximity with the rod for delivering the light signal to a second end of the rod;
- at least one electromagnet excited by a control signal for creating an electromagnetic field with a predetermined polarity;
- a solid state light source in communication with the channel for emitting light to the channel;
- wherein the electromagnetic field from the at least one electromagnet interacts with the second end of the rod to induce rotation of the
- rod and the flame shaped surface about an axis of the mount to create an artificial flickering flame.

23. The system of claim 22 wherein said channel is a hollow cable.

24. The system of claim 22 further including a heat sink for removing heat.

25. The system of claim 22 wherein the solid state source is an LED.

26. The system of claim 22 further including at least one dichroic filter for modifying the wavelength of the light from the LED.

27. The system of claim 22 further including a control board for housing a micro-controller for delivering the control signal to the at least one electromagnet.

28. The system of claim 27 wherein the control signal is stored in a memory on the control board.

29. The system of claim 22 further including at least one condenser lens and at least one ball lens in communication with the solid state light source for focusing light.

30. A flickering flame simulation device comprising:
- an element having at least one reflecting surface on one side thereof;
- a housing in which said element is mounted;
- a light conduit having a first and second end communicating at its first end with said housing and at its second end with a source of light; and
- at least one light transmitting channel having a first end adjacent one side of said element extending through and fixed to a gimbal member rotatably mounted about a horizontal axis within said housing, said channel having a second end spaced from the first end of said light conduit whereby light emitted from said light conduit when said source of light is actuated is transmitted across said air gap to said channel moving the same about the horizontal axis of said gimbal member thereby moving said element creating a flickering effect of the reflecting surface of said element.

31. The device of claim 30 wherein said channel is an optical cable.

32. The device of claim 30 wherein said element has a thin elongated member extending upwardly therefrom and fixed to said element creating the appearance of a wisp of smoke when said element moves.

33. The device of claim 30 wherein said housing has an inner wall and said gimbal member includes a ring having a central opening and having an outer surface and having a pair of outwardly extending rods fixed thereto rotatably secured to the inner wall of said housing, said at least one channel extending through said opening through said ring.

34. The device of claim 30 wherein said element is tear-drop shaped simulating a flame.

35. The device of claim 30 wherein a second channel extends through the opening in said ring also having a first end and a second end, said second end being spaced from said light conduit forming said air gap, said element being disposed between the first ends of said channels and fixed thereto, both of said channels being secured together at their second end spaced from said air gap and having a generally vertically extending portion extending upwardly from their second ends and curving outwardly, then inwardly at their first ends forming a gap between the first ends of said channels.

36. The device of claim 30 wherein said element includes a reflecting surface on both sides thereof.

37. The device of claim 33 wherein said rods are fixed to the outer surface of said ring.

38. The device of claim 33 including a second channel extending through the opening in said ring, also having a first end and a second end, said second end being spaced from said light conduit forming said air gap, said element being disposed between the first ends of said channel and fixed thereto.

39. The device of claim 38 wherein said second channel is also an optical cable.

40. The device of claim 39 wherein said gimbal member includes a pin extending between the first ends of said optical cables, said optical cables rotating about said pin when light is applied across said air gap.

41. The device of claim 40 wherein said ring has an upper surface with a pair of oppositely spaced grooves thereon, said pin resting in said opposed grooves.

42. The device of claim 35 wherein said channels are optical cables.

43. The device of claim 35 wherein said housing has an inner wall and said gimbal member includes a ring shaped member having a central opening spaced from the inner wall of said housing and rotatably connected thereto, the first ends of both of said channels extending through said central opening of said ring shaped member.

44. The device of claim 43 wherein said gimbal member includes a pin coupled to said ring and extending through the gap between said channels.

45. The device of claim 44 wherein said ring has an upper rim and said pin rests in opposed grooves on the upper rim of said ring.

46. A flickering flame simulation device comprising:
- an element having at least one reflecting surface on side thereof;
- a housing in which said element is mounted;

a rod fixed to said element at one end thereof extending through a gimbal member rotatably mounted in said housing and said rod terminating at its other end is an electromagnetic base;

electromagnetic means mounted in said housing below said base;

light emitting means focused on said base mounted in said housing below said electromagnetic means; and memory module means associated with said housing below said light emitting means having digital code signals stored therein for exciting said electromagnetic means and creating a field with a predetermined polarity around said electromagnetic means thereby moving said base toward or away from said electromagnetic means depending on the polarity of the base and the electromagnetic means thereby moving said element while light from said light emitting means is focused thereon providing a flame effect on the reflecting surface of said element.

47. The device of claim 46 wherein said light emitting means includes at least one LED.

48. The device of claim 46 wherein said light emitting means includes a plurality of LEDs.

49. The device of claim 46 including a condenser lens mounted in said housing between said light emitting means and said electromagnetic means.

50. The device of claim 46 including a thin elongated member fixed to said element extending upwardly therefrom.

* * * * *